United States Patent
Nishihara et al.

(10) Patent No.: US 6,864,790 B2
(45) Date of Patent: Mar. 8, 2005

(54) ELECTRONIC APPARATUS AND METHOD OF DETECTING SHOCK GIVEN TO THE ELECTRONIC APPARATUS

(75) Inventors: Kazunari Nishihara, Osaka (JP); Hirofumi Tajika, Osaka (JP); Motoyuki Toji, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 7 days.

(21) Appl. No.: 10/257,099

(22) PCT Filed: Feb. 14, 2002

(86) PCT No.: PCT/JP02/01246
§ 371 (c)(1),
(2), (4) Date: Feb. 12, 2003

(87) PCT Pub. No.: WO02/065141
PCT Pub. Date: Aug. 22, 2002

(65) Prior Publication Data
US 2003/0151517 A1 Aug. 14, 2003

(30) Foreign Application Priority Data
Feb. 15, 2001 (JP) .................................... 2001-038053

(51) Int. Cl.[7] .............................................. G08B 21/00
(52) U.S. Cl. ...................... 340/540; 340/660; 73/12.01; 73/12.06
(58) Field of Search .................. 340/440, 665, 340/669, 540, 506, 588, 573.1, 573.6, 573.7, 825.36, 825.49; 360/60, 75; 73/12.01, 12.06, 519.34; 455/226.2; 702/184

(56) References Cited

U.S. PATENT DOCUMENTS

| | | | |
|---|---|---|---|
| 5,659,302 A | | 8/1997 | Cordier |
| 6,098,460 A | * | 8/2000 | Otsuchi et al. .......... 73/514.34 |
| 6,453,266 B1 | * | 9/2002 | Chainer et al. ............. 702/184 |
| 6,570,503 B1 | * | 5/2003 | Ulert et al. ............... 340/573.1 |
| 6,603,620 B1 | * | 8/2003 | Berding ....................... 360/60 |

FOREIGN PATENT DOCUMENTS

| | | |
|---|---|---|
| EP | 1 109 378 | 6/2001 |
| JP | H4-94843 | 8/1992 |
| JP | 11-190745 | 7/1999 |
| JP | 2000-312255 | 11/2000 |
| JP | 2001-272413 | 10/2001 |

OTHER PUBLICATIONS

International Search Report, Apr. 23, 2002 (Japanese).

* cited by examiner

Primary Examiner—Davetta W. Goins
(74) Attorney, Agent, or Firm—RatnerPrestia (57) ABSTRACT

An electronic apparatus is provided that comprises a shock detector for detecting a shock received by an electronic apparatus such as a portable telephone, a controller for comparing the value of the shock as detected by the shock detector with a reference value, and a memory element for storing an identifying signal generated when the value of a shock has exceeded the reference value and the value of shock. This enabling easy determination as to whether or not a breakdown has been caused by shock.

16 Claims, 6 Drawing Sheets

ELECTRONIC APPARATUS AND METHOD OF DETECTING SHOCK GIVEN TO THE ELECTRONIC APPARATUS

TECHNICAL FIELD

The present invention relates to an electronic apparatus such as portable telephone and method of detecting a shock given to the apparatus.

BACKGROUND ART

Technical innovations in electronic components have enabled miniaturization of various types of electronic apparatus and the miniaturization has enabled widespread use of portable information devices as represented by portable telephones.

A major cause of breakdown during use of portable telephones is dropping.

An electronic apparatus that was dropped naturally receives a shock, and is at times damaged.

There has been a problem that, on such an occasion, when the user requests the manufacturer or servicing company for repair, it takes time for the manufacturer to identify the cause of breakdown. This hampers immediate response to the repair request.

The warranty may state that "Even when the product is under warranty, if the breakdown is due to dropping of the product by the user, the breakdown will not be covered by warranty." However, the user may request the manufacturer or servicing company for charge-free repair or charge-free replacement when the occurrence of the damage is within the warranty period.

In such a case, it is not possible to prove that the electronic apparatus (a portable telephone, for example) has been given an extraordinary large shock (hereinafter referred to as "excessive shocks") that would not occur in normal use. When a breakdown is surmised by the manufacturer or servicing company to have been caused by dropping, as long as the user claims that it is not due to dropping, the manufacturer or servicing company had to accept the request for charge-free repair or charge-free replacement.

DISCLOSURE OF INVENTION

An electronic apparatus is provided that comprises a shock detector having a shock detecting element and a conversion circuit for converting a signal from the shock detecting element into an electric signal. A controller compares the value of a shock detected by the shock detector with a reference value. A memory element stores an identifying signal that is generated when the value of a shock has exceeded the reference value and the value of the shock.

BEST MODE FOR CARRYING OUT THE INVENTION

Referring to FIGS. 1 to 10, a description will be given below on exemplary embodiments of the present invention.
(Exemplary Embodiment)

Figure 1:
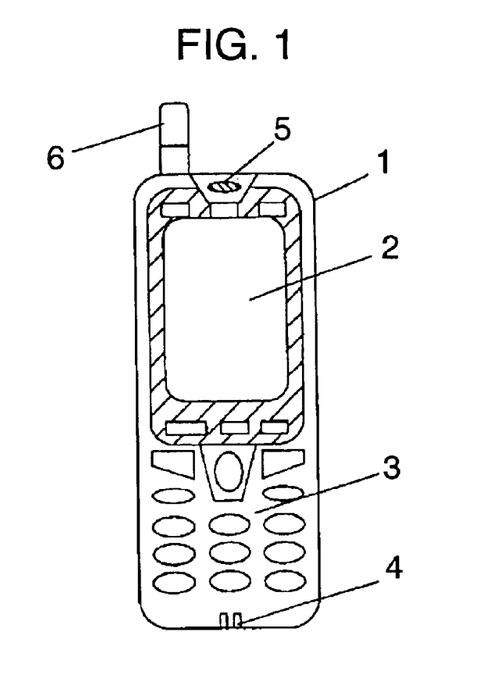
FIG. 1 is a front view of an exemplary embodiment of the present invention.
Figure 2:
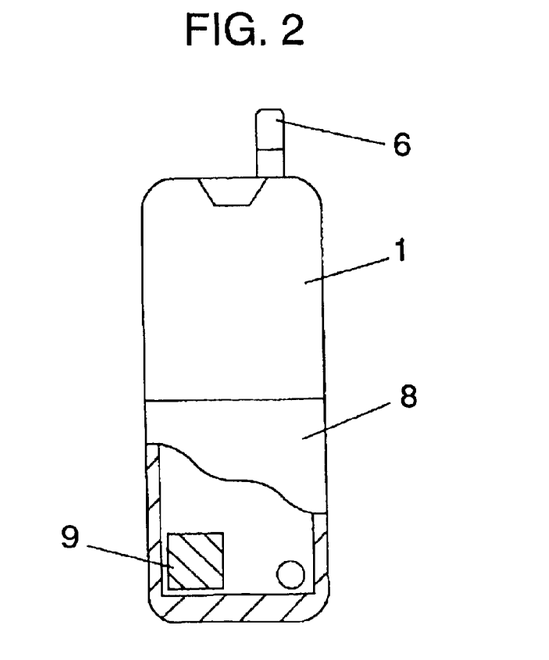
FIG. 2 is a partially broken rear view of the exemplary embodiment of the present invention.

In FIG. 1 and FIG. 2, display 2, operating section 3, microphone 4, and speaker 5 are provided on the front side of the exterior surface of body case 1 of a portable telephone.

Also, antenna 6 is provided on the upper surface of body case 1 and, toward a lower position, a terminal for charging (not shown) and a terminal for external connection (numeral 7 in FIG. 7) are provided.

Furthermore, battery 8, a rechargeable battery, for example, is detachably placed on the rear side of the interior of body case 1.

Shock detector 9 is provided at a lower corner of the interior of body case 1.

Figure 3:
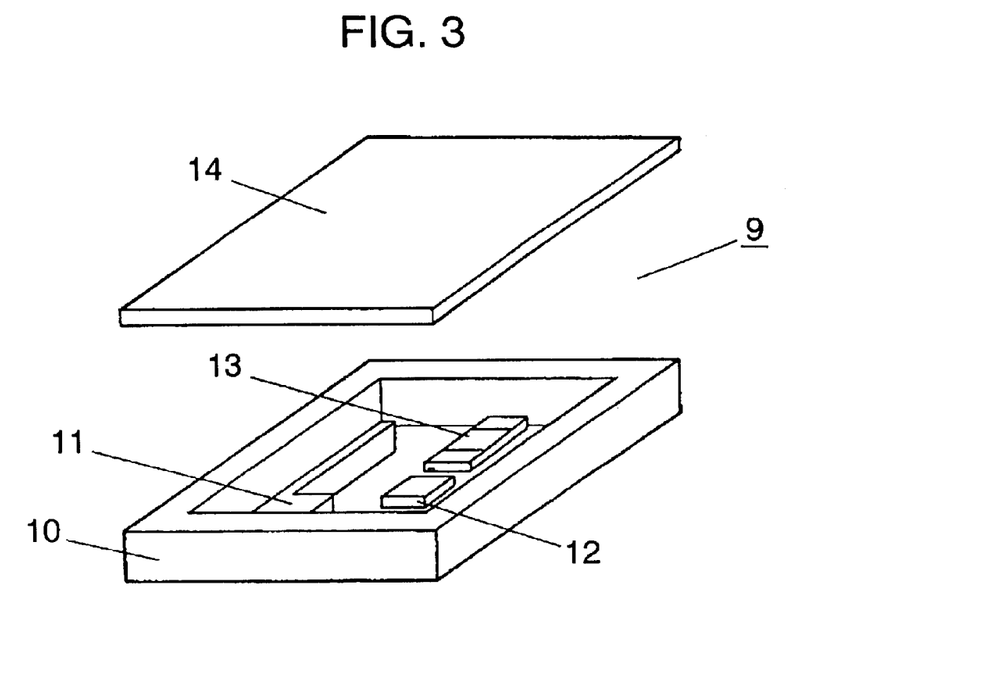
FIG. 3 is a perspective exploded view of a shock detector in the exemplary embodiment of the present invention.

As illustrated in FIG. 3, shock detector 9 comprises case 10 having an upper opening and lid 14 for covering the upper opening. Case 10 houses shock detecting element 11, field effect transistor 12 (FET), and resistor 13.

Figure 5:
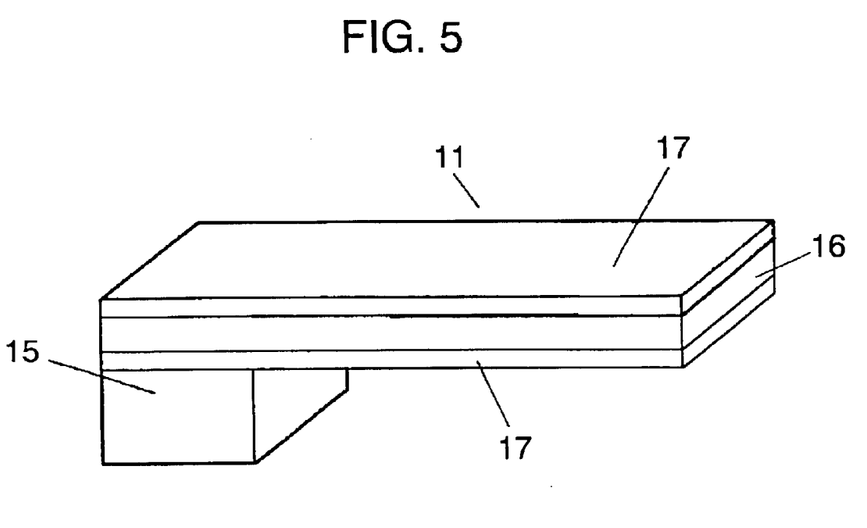
FIG. 5 is a perspective view of a shock detecting element in the exemplary embodiment of the present invention.

As illustrated in FIG. 5, shock detecting element 11 comprises fixed section 15 and vibrating section 16, one side of which is fixed to fixed section 15. Fixed section 15 is fixed on the inner bottom surface of case 10 as illustrated in FIG. 3. Vibrating section 16 is made free to vibrate and electrodes 17 are provided on its front and rear surfaces. As vibrating section 16 is of bimorph structure made by cementing two piezoelectric plates with respective direction of polarization opposing to each other, electric charges are generated between two electrodes 17, 17 when a shock (acceleration) is applied.

Figure 4:
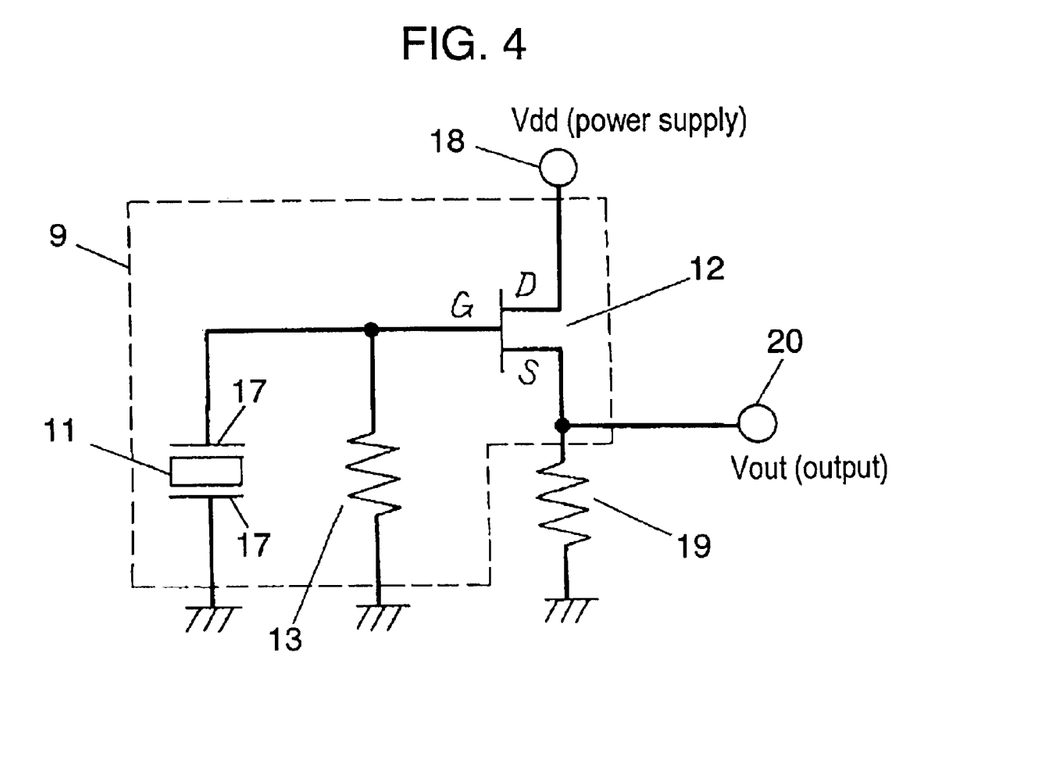
FIG. 4 is a circuit diagram of the shock detector in the exemplary embodiment of the present invention.

Also, these components are electrically connected by a conversion circuit shown in FIG. 4 for converting a signal from shock detecting element 11 into an electric signal.

In other words, shock detecting element 11 and resistor 13 are connected in parallel, and their point of connection is connected to gate G of FET 12. Accordingly, when electric charges are generated between two electrodes 17, 17 due to a shock as described above, they are converted into a voltage signal by resistor 13 as illustrated in FIG. 6, and the voltage is applied to gate G.

Also, power supply terminal 18 is connected to drain D of FET 12 to which a voltage is supplied from a power source (numeral 31 in FIG. 7) directly or indirectly obtained from battery 8.

Furthermore, resistor 19 and output terminal 20 are connected to source S of FET 12.

Figure 6:
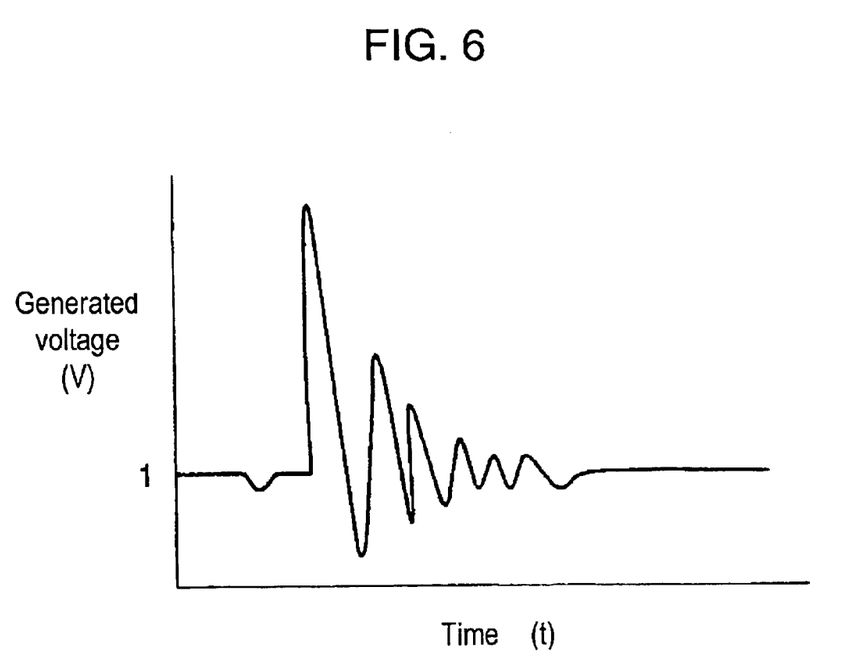
FIG. 6 is a characteristic diagram in the exemplary embodiment of the present invention.

Suppose, far instance, that the voltage applied to power supply terminal 18 in FIG. 4 to be three volts and the resulting voltage at the point of connection between resistor 19 and source S to be one volt, the voltage that develops across resistor 13 due to a signal from shock detecting element 11 will oscillate up and down with the above-mentioned one volt in the center as shown in FIG. 6. The voltage is directly output as an electric signal from output terminal 20.

In the above structure, when body case 1 as shown in FIG. 1 is dropped on the floor, shock detecting element 11 detects the shock due to impact. The electric charges generated in shock detecting element 11 are converted into an electric signal by the conversion circuit shown in FIG. 4 for output at output terminal 20, which is subsequently supplied to controller 21 in FIG. 7.

Figure 7:
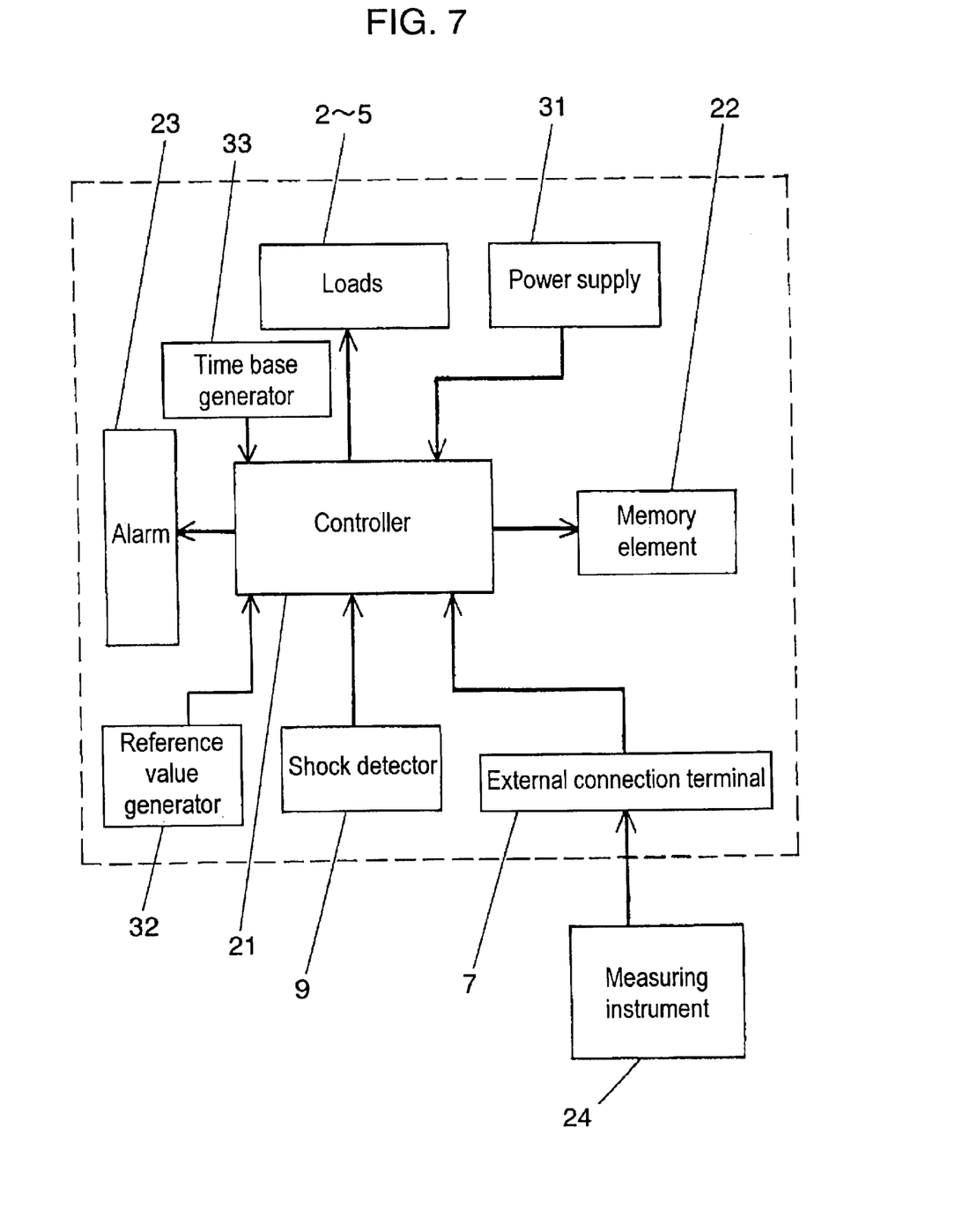
FIG. 7 is a control circuit diagram in the exemplary embodiment of the present invention.

Controller 21 has a function of comparing the input signal with a reference value generated by reference value generator 32. When the input signal is greater than the reference value, namely, on the occasion of an excessive shock, controller 21 stores in memory element 22 an identifying signal to determine whether an excessive shock has occurred, the value of the input signal (the value of the shock), and the date and time of occurrence as known from time base generator 33. It also has a function of informing the user based on an identifying signal that an excessive shock has been detected by alarm 23.

By using speaker 5 in FIG. 1 as a sound-making member of alarm 23, it is possible to inform the user occurrence of an excessive shock with sound.

Also, by providing a light-emitting member in body case 1 in FIG. 1 as alarm 23, it is possible to inform the user occurrence of an excessive shock with light.

Furthermore, by using display 2 as alarm 23, it is possible to inform the user occurrence of an excessive shock with characters and symbols on display 2.

By informing occurrence of an excessive shock to the user by alarm 23 using these means, the user can immediately recognize after dropping that a breakdown is due to an excessive shock resulting from dropping. This makes it easy for the user to recognize the cause of breakdown.

As a) an identifying signal as to whether an excessive shock has occurred, b) the value of the shock, namely, magnitude of the shock, and c) the date and time of occurrence of the shock are stored in memory element 22 of FIG. 7, both the manufacturer or servicing company and the user can jointly confirm the information stored in memory element 22 when the user takes body case 1 to the manufacturer or servicing company.

To be more specific, by connecting measuring instrument 24 to external connection terminal 7 as shown in FIG. 7 and confirming the information stored in memory element 22, a determination can be made as to whether the breakdown is due to an excessive shock resulting from dropping and the like, and the magnitude of the excessive shock as well as the date and time of occurrence of the excessive shock can be easily known.

Accordingly, by being able to clarify the cause of the breakdown, quick response to a repair request can be made.

Also, there will be fewer requests by the user for charge-free repair or charge-free replacement.

Shock detector 9 that includes shock detecting element 11 is provided at a corner inside body case 1 as illustrated in FIG. 2.

In general, corners of a case have high strength as plural number of walls converge at corners. As shock detector 9 is provided at such a corner, possibility of being damaged is low.

In other words, by making the strength of shock detecting unit 25 higher than that of load unit 26 thereby making it stronger to damage due to an excessive shock, shock detection can be made without failure.

Figure 8:
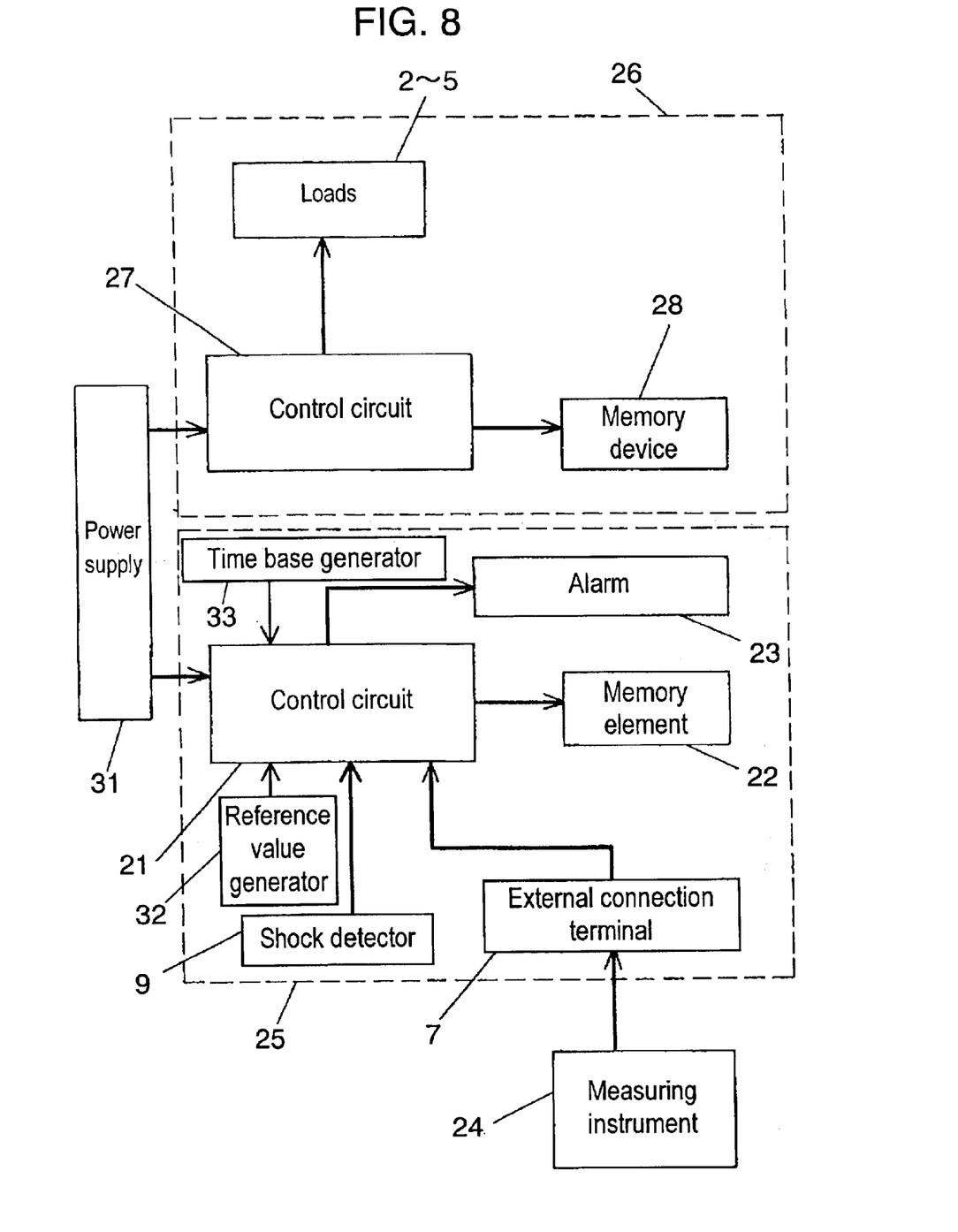
FIG. 8 is a control circuit diagram in another exemplary embodiment of the present invention.

In the meantime, in FIG. 8, control circuit 27 for controlling loads (numerals 2 to 5) is connected to memory device 28 in which programs for controlling the operation of control circuit 27 are stored.

Figure 9:
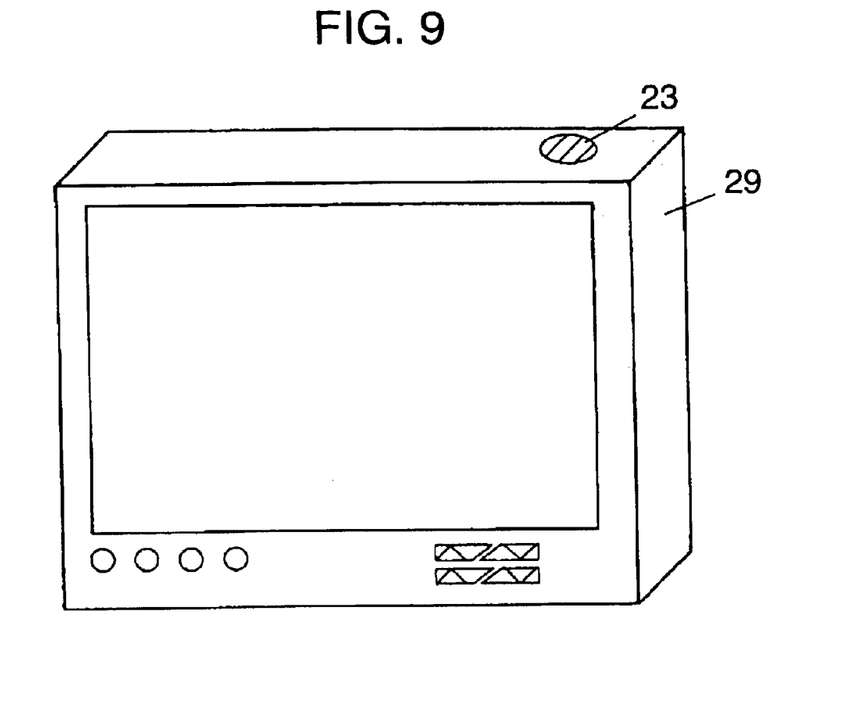
FIG. 9 is a perspective view in another exemplary embodiment of the present invention.
Figure 10:
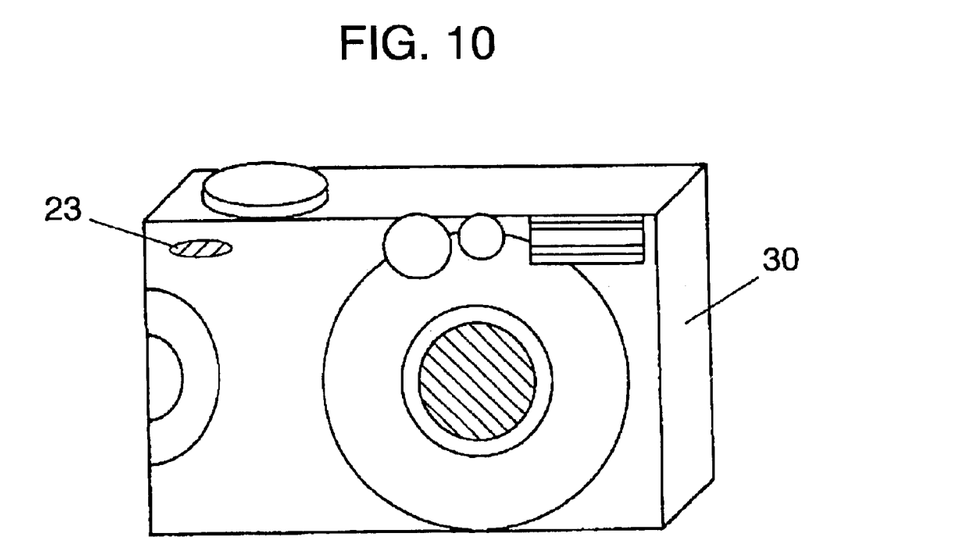
FIG. 10 is a perspective view in another exemplary embodiment of the present invention.

Furthermore, in this exemplary embodiment, though a description was made on a portable telephone as an example, the electronic apparatus and the shock detecting method for an electronic apparatus in accordance with the present invention may be applied to a portable TV shown in FIG. 9, or a camera shown in FIG. 10, or other electronic devices as other embodiments of the present invention.

In FIG. 9, shock detector 9 as illustrated in FIG. 3 is provided in body case 29 of a TV, and alarm 23 is exposed to the outer surface of body case 29.

In FIG. 10, shock detector 9 as illustrated in FIG. 3 is provided inside body case 30 of a camera, and alarm 23 is exposed on the outer surface of body case 30.

INDUSTRIAL APPLICABILITY

The present invention provides an apparatus for detecting a shock received by an electronic apparatus such as a portable telephone and method of detecting the shock. The apparatus enables easy determination as to whether or not a breakdown of an electronic apparatus has been caused by an excessive shock such as due to dropping.

What is claimed is:

1. An electronic apparatus comprising:
   a shock detector unit for use with a load unit including:
   (a) a shock detector including:
      a shock detecting element; and
      a conversion circuit for converting a signal from said shock detecting element into an electric signal;
   (b) a controller for comparing a value of a shock as detected by said shock detector with a reference value; and
   (c) a memory element for storing an identifying signal that is generated when said value of the shock has exceeded said reference value and said value of the shock,
   wherein said shock detector unit is separate from said load unit, and a strength of said shock detector unit is higher than that of said load unit.

2. The electronic apparatus of claim 1 further comprising:
   an external connection terminal that is connected to said controller and that outputs said identifying signal and said value of said shock stored in said memory element.

3. The electronic apparatus of claim 1 further comprising:
   an alarm that is connected to said controller and that outputs an alarm signal based on said identifying signal.

4. The electronic apparatus of claim 3, wherein said alarm has a sound-generating member.

5. The electronic apparatus of claim 3, wherein said alarm has a light-emitting member.

6. The electronic apparatus of claim 3, wherein said alarm has a display.

7. The electronic apparatus of claim 1, wherein
   said memory element stores said identifying signal, said value of said shock, and the time and date said shock has occurred.

8. The electronic apparatus of claim 1, wherein
   said shock detector is provided at a high strength location inside a case of the electronic apparatus.

9. A method of detecting a shock, said method comprising the steps:
   (A) providing a shock detector unit for use with a load unit, said shock detector unit including:
      (a) a shock detector including:
         a shock detecting element; and a conversion circuit for converting a signal from said shock detecting element into an electric signal;

(b) a controller for comparing a value of the shock as detected by said shock detector with a reference value; and (c) a memory element for storing an identifying signal that is generated when said value of the shock has exceeded said reference value and said value of the shock, wherein said shock detector unit is separate from the load unit and a strength of said shock detector unit is higher than that of said load unit;

(B) detecting said value of the shock by means of said shock detector of said shock detector unit;

(C) comparing said value of the shock with said reference value using said controller; and (D) generating said identifying signal when said value of the shock has exceeded said reference value.

10. The method of detecting a shock of claim 9 further comprising the step of:

storing in said memory element said value of said shock and time and date said shock has occurred.

11. The method of detecting a shock according to claim 9, said method further comprising the steps of:

storing said identifying signal in a memory element; and outputting the stored information from said memory element.

12. The electronic apparatus of claim 2, wherein said memory element stores said identifying signal, said value of said shock, and the time and date said shock has occurred.

13. The electronic apparatus of claim 3, wherein said memory element stores said identifying signal, said value of said shock, and the time and date said shock has occurred.

14. The electronic apparatus of claim 4, wherein said memory element stores said identifying signal, said value of said shock, and the time and date said shock has occurred.

15. The electronic apparatus of claim 5, wherein said memory element stores said identifying signal, said value of said shock, and the time and date said shock has occurred.

16. The electronic apparatus of claim 6, wherein said memory element stores said identifying signal, said value of said shock, and the time and date said shock has occurred.

* * * * *

UNITED STATES PATENT AND TRADEMARK OFFICE
CERTIFICATE OF CORRECTION

PATENT NO. : 6,864,790 B2
DATED : March 8, 2005
INVENTOR(S) : Kazunari Nishihara et al.

It is certified that error appears in the above-identified patent and that said Letters Patent is hereby corrected as shown below:

<u>Title page,</u>
Item [57], ABSTRACT,
Line 8, delete "enabling" and insert -- enables --.

Signed and Sealed this

Twenty-ninth Day of November, 2005

JON W. DUDAS
*Director of the United States Patent and Trademark Office*